United States Patent
McMillen et al.

[15] 3,693,506
[45] Sept. 26, 1972

| | | |
|---|---|---|
| [54] | CONTROL CIRCUIT | |
| [72] | Inventors: | Kenneth G. McMillen, Wolcottville; Wendell E. Miller, Warsaw, both of Ind. |
| [73] | Assignee: | Borg-Warner Corporation, Chicago, Ill. |
| [22] | Filed: | April 15, 1971 |
| [21] | Appl. No.: | 134,466 |

Related U.S. Application Data

[63] Continuation of Ser. No. 757,961, May 1, 1968, abandoned.

[52] U.S. Cl. .................... 91/412, 91/433, 91/448, 137/115
[51] Int. Cl. ............................................. F15b 11/00
[58] Field of Search ........ 137/115; 91/412, 433, 434, 91/448

[56] References Cited

UNITED STATES PATENTS

| | | |
|---|---|---|
| 1,994,974 | 3/1935 | Wiedmann ............... 91/412 X |
| 2,591,641 | 4/1952 | Troendle ............... 137/116 X |
| 3,405,608 | 10/1968 | Teale ........................ 91/412 |
| 3,443,379 | 5/1969 | Weisenbach ............. 91/412 X |

Primary Examiner—M. Cary Nelson
Assistant Examiner—David J. Zobkiw
Attorney—Donald W. Banner

[57] ABSTRACT

A control circuit for a plurality of manual control valves each controlling a hydraulic motor including a bypass valve and a first logic system including a means for each control valve adapted to select and transmit the load actuating pressure. The circuit includes a second logic system connected to the first logic system which selects the highest pressure signal transmitted by the first logic system and supplies same to a control means for the source of supply pressure to act as a signal pressure to ensure that adequate pressure exists in the fluid pressure supply conduit to the control valves.

23 Claims, 6 Drawing Figures

CONTROL CIRCUIT

This application is a continuation of Ser. No. 757,961, filed May 1, 1968 and now abandoned.

SUMMARY OF INVENTION

In control circuits where a plurality of hydraulic motors are controlled by manual valves it has been a problem recognized by those skilled in the art to provide a system in which a pressure as required by a particular work cylinder can be supplied to the work cylinder even though a much higher pressure exists in the system. The present invention utilizes a control signal supply means or logic means which includes a first logic system incorporating a means to select the load actuating pressure of a particular manual valve and transmit same to a second logic system. The second logic system operates to admit the highest pressure transmitted by the first logic system to a control signal conduit so that the source of supply may be adjusted to supply the pressure and flow requirements of the motor requiring the highest load actuating pressure. By providing a first and second logic system a flow control valve if used may be connected between the logic systems at a particular manual valve whereby the flow control valve can operate in accordance with the requirements of a particular motor providing control of the motor independent of any other motors. By use of shuttle valves (at each motor cylinder and control valve) connected in series as a second logic system, an automatic connection to negate the pressure in the control signal conduit can be made when each of the valves is in its neutral position or to reduce the pressure in the control signal conduit when required by changing load conditions.

DESCRIPTION OF THE DRAWINGS

FIG. 3 is a modified form of a portion of the control circuit of FIG. 1;

FIG. 4 is a view illustrating a variable displacement pump as a fluid supply for the system of FIG. 1;

FIG. 5 is a modified form of a portion of the control circuit of FIG. 1; and

The present invention comprises a control system for a plurality of hydraulic motors which is adapted to supply pressure to the motors insuring that pressure slightly in excess of that which is needed by a particular motor will be supplied to the motor and the circuit includes means to signal the supply source of the highest load actuating pressure of any of the motors required at any given time. The control valves may further include an improved flow control mechanism to ensure that, regardless of the pressure of the fluid supply, pressure will be supplied to a particular motor at a pressure level as required by that motor.

Figure 1:
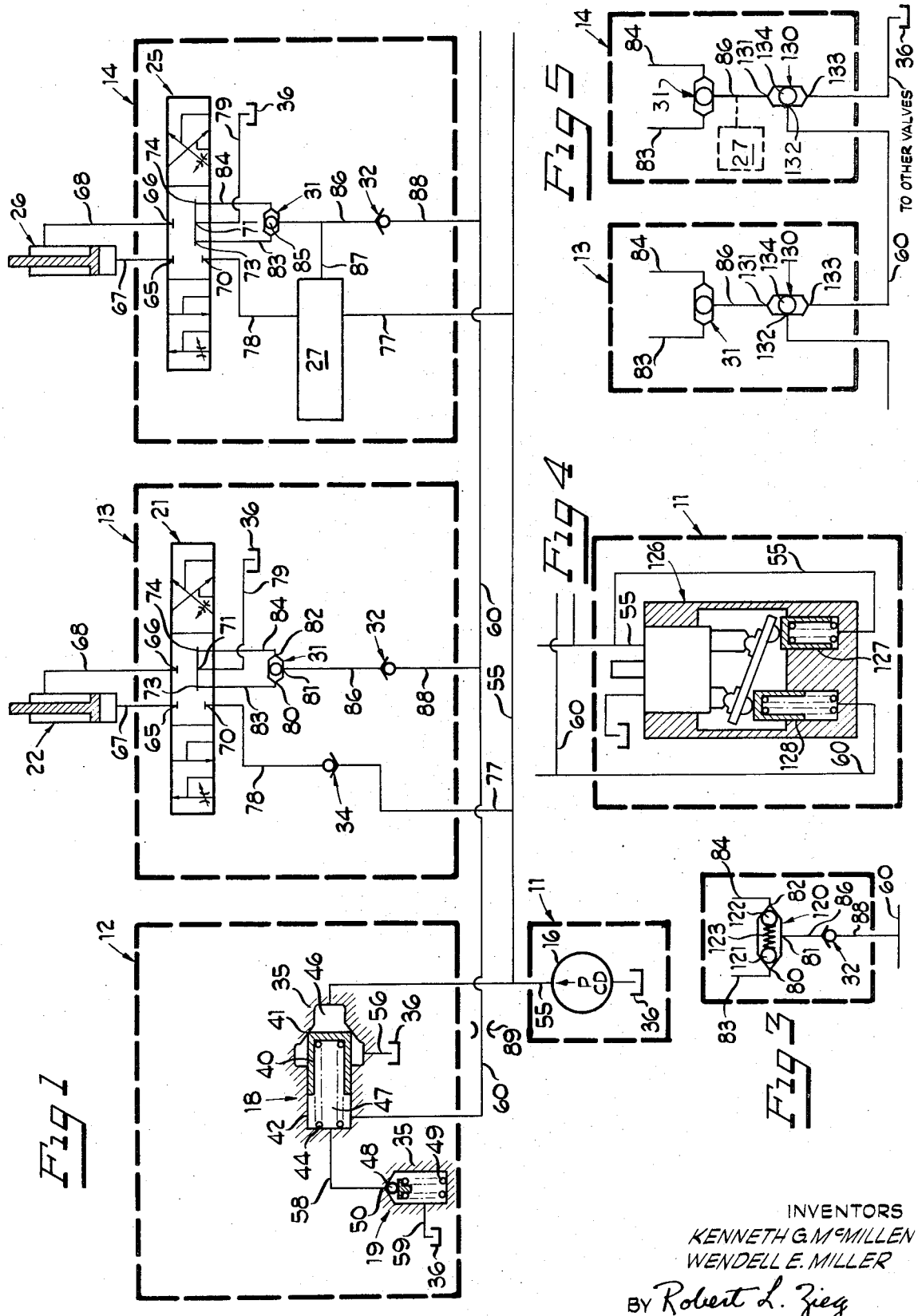
FIG. 1 is a schematic view of a control circuit embodying the principles of the present invention.

Referring to FIG. 1, the main components of the present control circuit 10 are schematically illustrated. Control circuit 10 includes a source of fluid supply 11, an inlet section 12, a control valve section 13 and a control valve section 14.

In FIG. 1 the supply section as illustrated includes a fixed displacement pump 16, the inlet section 12 includes a fluid pressure responsive means or bypass valve 18 and a relief valve 19. Valve section 13 includes a control valve 21 for controlling a hydraulic motor or work cylinder 22. Valve section 14 likewise includes a control valve 25 controlling hydraulic motor or work cylinder 26 and includes a flow control valve 27. Valve sections 13 and 14 further are provided with control signal supply means or logic means including shuttle valves 31 and check valves 32. In addition, valve section 13 includes a load check valve 34.

Each of the valves included in the inlet section 12 and valve sections 13 and 14 are illustrated as mounted in a portion of a valve body 35 which may be a common body to all of the valves or each of the sections may be mounted in a separate valve body. A fluid sump 36 is illustrated in various places throughout the control schematic for purposes of illustration although the actual control circuit would include a single sump 36.

Referring to the inlet section 12, bypass valve 18 includes a piston 40 engageable with a tapered seat 41 provided within a bore 42 in the valve body 35. A spring 44 engages piston 40 urging it toward engagement with seat 41. The piston 40 divides the bore 42 into a chamber 46 and a chamber 47. Relief valve 19 includes a ball poppet 48 and a spring 49 urging the ball to a position engaging a seat 50 in the valve body 35.

Bypass valve 18 has its chamber 46 connected to the pump 16 by means of a fluid supply conduit 55. When piston 40 moves to the left a connection is opened between chamber 46 and sump 36 through a conduit 56. Relief valve 19 is connected to chamber 47 of the bypass valve 18 by a conduit 58 and the interior of the relief valve 19 is connected to sump 36 by a conduit 59. Chamber 47 of bypass valve 18 is connected to a control signal conduit 60.

Valve sections 13 and 14 are identical with the exception that in valve section 14 the load check valve 34 is replaced by the flow control valve 27. The description will therefore relate, insofar as the control valve itself is concerned, to one of the valves, common numbers being given to each valve since the construction and operation of the control valves 21 and 25 is identical. Further, it will be understood from the description given that additional valves can be provided in the circuit beyond the two illustrated depending on the number of hydraulic motors to be controlled. Control valves 21 and 25 each include a pair of motor ports 65 and 66 which are connected to opposite ends of the motors 22 or 26 by conduits 67 and 68 respectively. Control valves 21 and 25 further include an inlet port 70, at least one exhaust port 71, and control ports 73 and 74.

A conduit 78 connects the inlet port 70 of control valve 21 to load check valve 34 and inlet port 70 of control valve 25 to flow control valve 27. A conduit 77 connects load check valve 34 and flow control valve 27 with the fluid supply conduit 55. A conduit 79 connects exhaust ports 71 to the sump 36. The fluid actuated valve means or shuttle valve 31 for each of the control valves 21 and 25 is a three-port valve having ports 80, 81 and 82 and a poppet or ball 85. Ports 80 and 82 are connected by conduits 83 and 84 respectively to the control ports 73 and 74 and port 81 is connected to the check valve 32 by conduit 86. Check valves 32 are connected by a conduit 88 with the control signal conduit 60. A conduit 87 therein connects flow control valve 27 to conduit 86. Orifice 89 is provided in the control signal conduit 60 near bypass valve 18.

OPERATION OF THE CONTROL SYSTEM

Each of the control valves here illustrated, namely valves 21 and 25, are of identical structure to the improved valve shown in U.S. Pat. No. 3,526,247, of common assignee, for which, reference may be had for a detailed description of the control valve.

As illustrated in FIG. 1, there is provided a control valve for each motor to be controlled. There may be as many control valves and motors connected to the fluid supply conduit 55 and the control signal conduit 60 as desired. Each of the control valves is a three-position valve including a neutral position illustrated in the center thereof and power positions on the left and right sides thereof. In the neutral position illustrated in the center of control valves 21 and 25 inlet port 70 and work ports 65 and 66 are blocked. Control ports 73 and 74 are connected to the sump by conduit 79 when the control valves are in the neutral position.

In operation, pump pressure is supplied to conduit 55. The pressure in conduit 55 will be supplied to a motor through the conduits 77 and 78 when one of the valves 21 or 25 is moved to its left or right position. If, for example, valve 21 is moved to its power position on the left side thereof, pressure will be supplied through conduit 78 from the inlet port 70 through a variable orifice to motor port 65 to actuate the motor 22. At the same time, motor port 65 as illustrated will also be connected to the control port 73 and thus through conduit 83, port 80, shuttle valve 31, conduit 86, check valve 32, conduit 88, and into the control signal conduit 60. If the pressure in the control signal conduit 60 is already higher than that developed at the motor port 65, check valve 32 will remain closed. However, if the pressure in control signal conduit 60 is lower, the pressure supplied to motor 22 through motor port 65 will be communicated by conduit 60 to chamber 47 of bypass valve 18. Thus the bypass valve 18 will be urged to the right with a pressure reflecting the motor port pressure at valve section 13. If the pump pressure exceeds the control signal pressure in chamber 47 by more than the force of the spring 44 (for example if a 50 psi spring is used) and the control signal conduit has a pressure of 1500 psi therein, the valve piston 40 will move to the left at a value of 1550 psi in supply conduit 55 thereby maintaining the pressure in conduit 55 at 50 psi above the highest load actuating pressure of any of the control valves 21, 25 or any additional valve.

At the same time, as the connections are made between inlet port 70, motor port 65 and control port 73, connection is made between the other motor port 66, exhaust port 71 and control port 74. Thus the opposite side of motor 22 and the control port 74 will be connected to the sump through conduit 79, thus allowing the motor to be moved by pressure from motor port 65. Although the showing in FIG. 1 is schematic, it will be understood that when the valve 21, for example, is moved to its power position on the left side thereof, the variable orifice illustrated in the connection between ports 70 and 65 may be varied in size by the operator to control the rate of actuation of the motor 22 and since the bypass valve 18 in effect maintains a constant pressure drop across this variable orifice, the valve 21 may be easily operated to accurately control the speed or rate of actuation of motor 22.

If the valve 21 is moved to its power position shown on the right side thereof, as will be seen from the schematic illustration, the inlet port 70 is connected to the motor port 66 through a variable orifice and also to the control port 74 to actuate the motor 22 in the opposite direction. Thus again, a control port 74 is connected to the motor port 66 which is communicating fluid pressure to the motor and the pressure in port 66 will thus be communicated through conduit 84, shuttle valve 31, conduit 86, check valve 32, and conduit 88 to the control signal conduit 60. At the same time as illustrated in FIG. 1, the motor port 65 will be communicated to the sump 36 through exhaust port 71 as will conduit 83. As in the above description, manual control valve 21 may then be moved to establish an orifice size between inlet port 70 and motor 66, the bypass valve 18 maintaining a constant pressure drop across the orifice whereby reliable and consistent control of the speed or rate of actuation of motor 22 is provided.

The shuttle valve 31 shown in each of the valve sections communicates to conduit 86 the load actuating pressure preselected by the control valve position. The shuttle valve is displaced by the preselected load actuating pressure to a position preventing communication of this pressure with sump through conduit 79, forming together with the control ports 73, 74 and conduits 83, 84 what may be considered as a first logic system. Check valves 32 as illustrated in FIG. 1 connected in a parallel arrangement with conduits 88 and control signal conduit 60, may be considered a second logic system which will connect the highest load actuating pressure supplied by any of the first logic systems to the control signal conduit 60. Thus a logic means is provided including the first and second logic systems by means of which the highest load actuating pressure in the system will be communicated to conduit 60 to insure that adequate pressure will be supplied by the pump to meet the requirements of the motor having the highest pressure requirements.

At times in circuits of the type described it may be advantageous to provide a constant pressure drop between inlet port 70 and motor ports 65 or 66 thereby establishing a constant flow rate for a selected orifice independent of fluctuation in system pressure. To provide this function, the flow control valve 27 is provided as viewed in FIG. 1. Flow control valve 27 of FIG. 1 is illustrated in block form to show that flow control valves of known types may be incorporated in the improved control circuit of FIG. 1.

Figure 2:
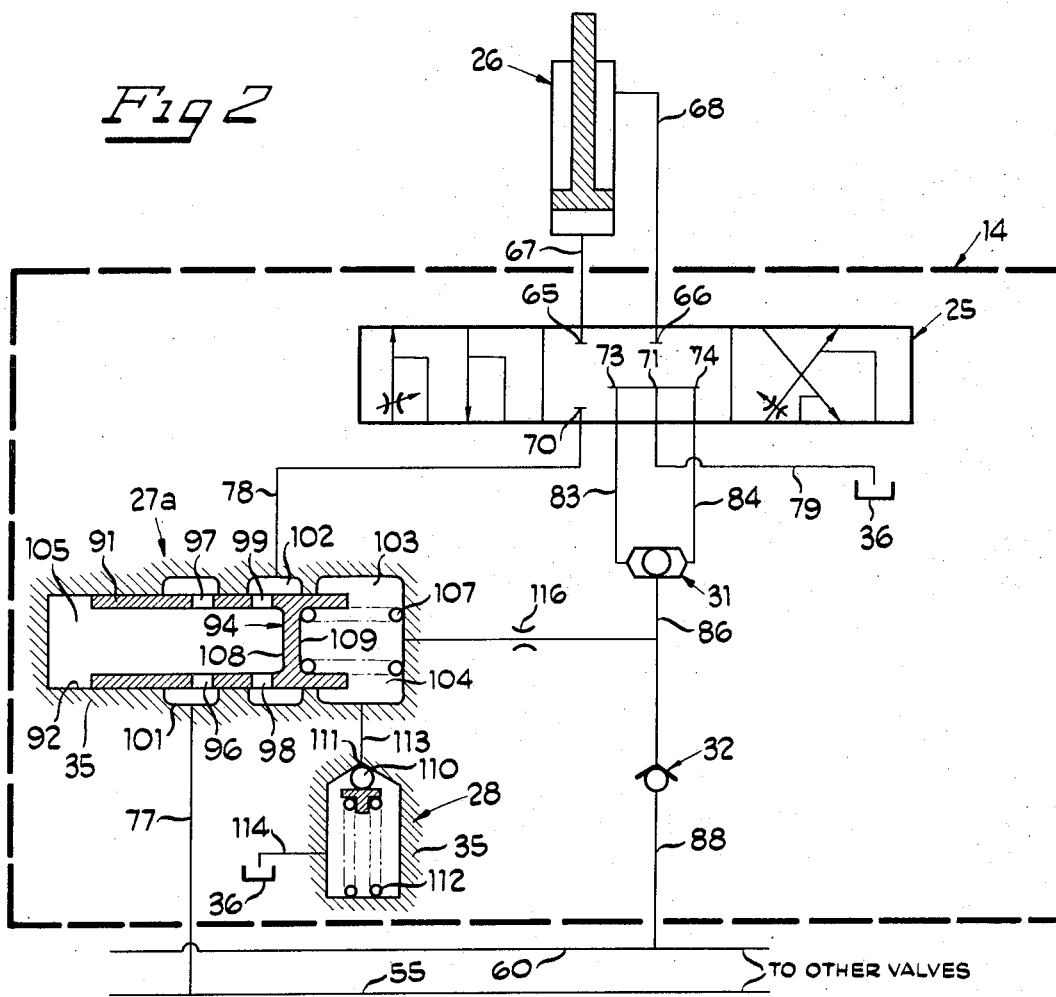
FIG. 2 is a modified form of a portion of the control system of FIG. 1 incorporating an improved flow control valve.

Referring to FIG. 2, an improved form of flow control valve is illustrated. The improved flow control valve 27a includes a piston 91 mounted in a bore 92 in the valve body 35. Piston 91 comprises a generally hollow cylinder having a barrier portion 94 and further having a pair of ports 96 and 97 directly opposite one another and a pair of ports 98 and 99 directly opposite one another. Provided in the valve body 35 is a pair of ports 101 and 102 and a large port 103 defining a pressure chamber 104. Barrier portion 94 and piston 91 further define a pressure chamber 105 on the left side of barrier portion 94. Port 101 of the flow control valve is connected to the supply pressure conduit 55 by conduit 77. Port 102 is connected by conduit 78 with the inlet port 70 of control valve 25. A spring 107 is provided urging the piston 91 to the left as illustrated in the drawing.

Barrier portion 94 includes a surface 108 in chamber 105 and a surface 109 in chamber 104. Surfaces 108 and 109 define together with the terminal ends of the piston 91 pressure responsive areas in each of the pressure chambers 104 and 105.

Relief valve 28 includes a poppet or ball 110 engaging a seat 111 and is urged into engagement with the seat by spring 112. Relief valve 28 is connected to the pressure chamber 104 by a conduit 113. The interior of the relief valve 28 is connected to the sump 36 by conduit 114. The flow control valve has its pressure chamber 104 connected to conduit 86 through an orifice 116.

Flow control valve 27a serves many functions in its operation in the valve section 14. It acts as a maximum flow limit, it acts to maintain a constant pressure drop across the variable orifice established in the control valve 25, it operates to regulate the fluid pressure to a desired maximum to be supplied to the motor 26, it also acts as a load check valve to prevent backflow when the load actuating pressure is equal to or greater than the system pressure from conduit 77, and also supplies a low standby pressure to the control valve when the control valve is in the neutral position.

The flow control valve 27a includes the ports 98 and 99 which may optionally be sized to establish a maximum flow limit through the flow control valve 27. The ports 96 and 97 in cooperation with the right edge of port 101, as viewed in FIG. 2, will establish a variable size orifice and meter fluid from the conduit 77 into conduit 78 to the inlet port 70 of the control valve. The spring 107 tends to move the piston 91 to a position to the left. Since the pressure responsive areas in chamber 104 and 105 are of equal area, the pressure being admitted into chamber 105 through ports 96 and 97 must exceed the pressure in chamber 104 by an amount determined by spring 107 to move the piston to the right to establish an orifice size and meter fluid through the ports 96 and 97. Since the pressure chamber 104 is connected to conduit 86 the pressure in chamber 104 will be the pressure supplied by the first logic system of the control valve which will be the load actuating pressure in the valve section 14.

Thus when the supply conduit supplies pressure to the flow control valve exceeding the motor port by an amount determined by the force of spring 107 and the piston 91 will move to the right to reduce the size of the orifice through ports 96 and 97 and meter fluid at a reduced pressure into the inlet port 70. Thus if the motor port pressure is 1,500 psi and the spring exerts a force equivalent to 35 psi when the pressure in conduit 55 is in excess of 1,535 psi, the piston will move to restrict the orifice size until the pressure in chamber 105 is reduced to 35 psi.

Flow control valve 27a is thus adapted to maintain a constant pressure drop across the variable orifice in the valve 25 whereby the motor 26 may easily be controlled by varying the variable orifice in the control valve 25. The flow control valve 27a further includes a relief valve 28. Relief valve 28 will serve to limit the pressure in the pressure chamber 104 to a maximum value thus regulating the pressure supplied to inlet port 70 to a predetermined maximum value. For example, if setting of relief valve 28 is 1,600 psi, when the pressure exceeds 1600 psi the relief valve 28 opens chamber 104 to sump 36 and a pressure drop across the orifice 116 is established stabilizing the pressure in chamber 104 at 1,600 psi and allowing the piston 91 to move to the right to restrict the flow of fluid coming into the inlet port 70 and allowing communication between inlet port 70 through ports 98 and 99 to chamber 104 thereby maintaining the pressure at approximately a 1,600 psi level in port 70.

In a similar manner to the example described, the flow control valve 27a provides a further advantage of maintaining the pressure in inlet port 70 at a low level determined by spring 107, when control valve 25 is in the neutral position. This is accomplished by the communication of chamber 104 to sump 36 through conduit 86, through shuttle valve 31 and conduit 83 or 84, thus eliminating the pressure signal from chamber 104. Therefore a pressure of approximately 35 psi in chamber 105 will move the piston 91 to the right establishing approximately a 35 psi low standby pressure in the inlet port 70.

A further advantage of the flow control valve 27a is to provide adequate pressure as required by the motor 26 regardless of the pressure in the system. If the pressure at the work cylinder 26 is 1,500 psi, the 1,500 psi pressure will be established in chamber 104. If the system pressure due to operation of another work cylinder is, for example, 2,000 psi, the 2,000 psi will be communicated through the ports 96 and 97 and act on the pressure responsive area in chamber 105 to move piston 91 to the right against a resistance of 1,500 psi plus 35 psi from spring 107 in chamber 104. Thus the piston 91 will move to the right restricting the amount of fluid admitted through ports 96 and 97 until the pressure is reduced to approximately 1,535 psi in the chamber 105. Thus the flow control valve 27a insures that pressure admitted to the inlet port 70 will be approximately 35 psi above that required at the work cylinder thereby establishing a 35 psi pressure drop across the variable orifice in the valve 25 between inlet port 70 and motor ports 65 or 66.

Valve piston 91 also acts as a load check valve when the load actuating pressure exceeds or is approximately equal to the pressure from the supply conduit 55, the piston will be moved to the left by spring 107 and load actuating pressure in chamber 104 to prevent flow from inlet port 70 to conduit 55. The piston 91 will remain in this position until pressure in supply conduit 55 is approximately 35 psi above the load actuating pressure.

Referring to FIG. 3, a modified form of a valve to replace the shuttle valve 31 is shown which comprises a valve 120 which has balls 121 and 122 therein urged apart by a spring 123. Valve 120 acts in a manner similar to shuttle valve 13. Whichever conduit, 83, 84, has the preselected load actuating pressure signal therein will have its respective ball 121 or 122 moved to allow communication between the port 80 or 82 and port 81, and will prevent communication between port 82 and 80. The valve 120 represents an optional form of valve which will work in the present control system.

Referring to FIG. 4, an optional form of pump comprising a variable displacement pump 126 is illustrated for the supply section 11 of FIG. 1. Pump 126 is, for example, of the variable angle swash plate axial piston type which has a fluid pressure responsive means comprising a control piston 127 connected to the supply pressure conduit 55 and a control piston 128 connected to the control signal conduit 60 to adjust pump displacement thereby maintaining pressure in conduit 55 at an approximately constant level above that in control signal 60 in accordance with the pressure requirements.

Referring to FIG. 5, an optional form of second logic circuit is illustrated in that the check valve 32 is replaced by shuttle valves 130. The shuttle valves 130 are connected in series in the conduit 60 each including ports 131, 132, 133 and a ball 134. The shuttle valves 130 operate similar to the check valves 32 in that the pressure in conduit 60 which is eventually communicated to the bypass valve or unloading valve 18 will be the highest load actuating pressure at any of the motor ports for any of the motors. For example, when the pressure in conduit 86 in the valve section 13 is higher than the pressure in conduit 60 communicated through port 133, ball 134 will move down to open communication between ports 131 and 132 admitting the pressure from conduit 86 into conduit 60 to be communicated to the bypass valve 18. When the pressure coming in from conduit 60 to port 133 exceeds that in conduit 86, ball 134 is moved up to provide communication between ports 133 and 132 thus blocking pressure from the valve section 13 from influencing the bypass valve 18. Flow control valves for sections 13 or 14 could also be provided using the shuttle valve 130 by connecting them to the conduit 86 as shown in hidden lines in section 14 of FIG. 5.

In the control system described above, with each of the modifications which may be used, the bypass or unloading valve 18, when there is no signal in the control signal conduit 60, as for example when each of the control valves 21, 25 or additional valves are in their neutral position, will operate to provide a low standby pressure as determined by the force of the spring 44. If the force of spring 44 requires 50 psi to move the piston 40 from its seat 41, the pump pressure in conduit 55 will be bypassed to the extent to maintain fluid pressure in conduit 55 of 50 psi thus providing a low pressure at standby.

When all of the control valves are returned to neutral position, the control signal conduit 60 will have a pressure therein which must be negated so that the bypass valve 18 can establish the low standby pressure. In the system illustrated in FIG. 1, the bypass valve 18 can be constructed such that the pressure in conduit 60 can leak past piston 40 into conduit 56 and to the sump 36. Optionally, a conduit having an orifice therein and connected between the conduit 60 and sump 36 may be provided to allow the pressure in conduit 60 to be negated and drained to sump.

The second logic system, as illustrated in FIG. 5, having shuttle valves 130 connected in series, is advantageous since it permits conduit 60 to be connected to sump 36 at a point beyond or within the last valve section. When all the control valves are placed in their neutral position, conduits 86 will be connected to sump 36 through conduits 83 or 84. Ball 134 of each of shuttle valves 130 will be maintained by the pressure in conduit 86 in its position blocking conduit 60 from the conduit 86 and thus the control pressure in conduit 60 can flow through each valve 130 to the sump. If at a particular control valve the ball 134 is in its down position and its conduit 86 is supplying the control pressure in conduit 60, the control pressure in conduit 60 can then flow to sump through conduits 86 and 83 or 84 of that particular valve. Thus the series arrange-ment of the second logic system in FIG. 5 conveniently provides a means of eliminating the pressure in control signal conduit 60 whereby the bypass valve 18 can establish a low standby pressure.

Figure 6:
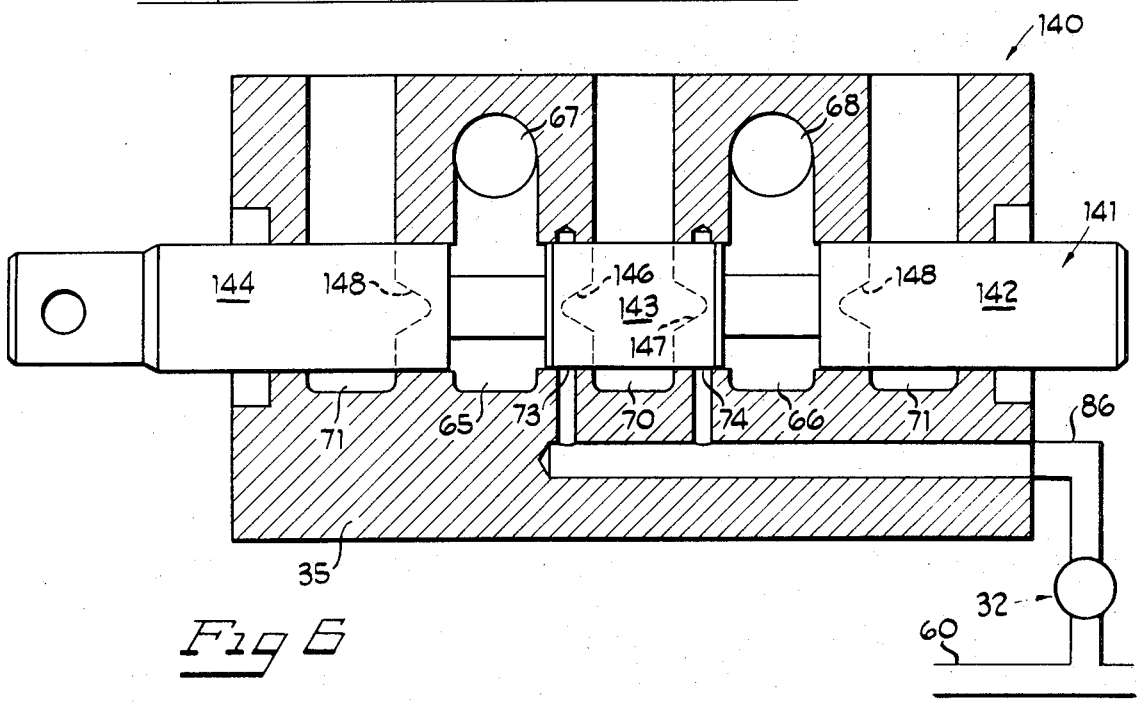
FIG. 6 shows a modified form of the control valves of the circuit of FIG. 1.

Referring to FIG. 6, a modified form of control valve is illustrated. Control valve 140 includes a valve spool 141 having lands 142, 143 and 144 thereon. Similar to the valves 21 and 25, valve 140 includes motor ports 65 and 66 connected to conduits 67 and 68, an inlet port 70 connected to conduit 78, and a pair of exhaust ports 71. The control ports 73 and 74 are mounted on opposite sides of the inlet port 70. The inlet port 70 has on either side thereof tapered notches 146 and 147. Exhaust ports 71 each has a tapered notch 148 on the side thereof toward its adjacent motor port.

The valve spool 141 is illustrated in its neutral position. If the valve spool would be moved to the right for example, first the motor port 65 would be connected to control port 73 and thus to conduit 86. As the spool 141 is moved further to the right, and notch 146 is uncovered, inlet pressure will be allowed through an orifice defined by the adjacent edge of land 143 and notch 146 into motor port 65 and through conduit 67 to the motor. The motor port 65 is thus placed in communication through control port 73 with conduit 86. Thus the conduit 86 will contain the pressure at motor port 65 which is the load actuating pressure and will supply this pressure to control signal conduit 60 to influence the bypass valve. As the valve spool 141 is moved to the right notch 148 will be uncovered by land 142. Communicating motor port 66 with exhaust port 71 to exhaust the opposite side of the motor. If the valve spool is moved to the left from its neutral position, operation is the same as before, communication first being established between the motor port 66 and the control port 74, and then communication established across an orifice defined by the right edge of land 143 and tapered notch 147, between the inlet port 70 and motor port 66. Thus at all times with the construction of FIG. 6, conduit 86 will be supplied with the load actuating pressure of the particular motor port that is being connected to the inlet pressure through the inlet port 70. Due to the improved construction of the valve 140, the need for the shuttle valves 31 or valves 120 is eliminated by providing the control ports 73 and 74 at a location between the motor ports and the inlet ports as illustrated in FIG. 6. A control valve of the type of control valve 140 may be easily utilized in the control circuit of FIG. 1. Thus in this embodiment the first logic system consists only of the construction and movement of the valve 140.

Various features of the invention have been particularly shown and described; however, it should be obvious to one skilled in the art that modifications may be made therein without departing from the scope of the invention.

What is claimed is:

1. A hydraulic system including a source of fluid supply comprising a pump and a sump and having a plurality of control valves and each of said control valves being connected by conduit means to a fluid motor and to said source;

a first fluid responsive means connected to said source and adapted to control the fluid supplied to said control valves by said source; each of said control valves having at least one control port adapted to be connected to the pressure being supplied to the corresponding fluid motor;

and logic means including said control port of each of said control valves and adapted to interconnect said ports and said fluid responsive means and effective to select the highest pressure being supplied to any of said fluid motors from said control valves for use as a control signal pressure and effective to return excess control signal pressure to the corresponding fluid motor through said one control port of whichever control valve is supplying the highest pressure to its respective motor when said highest selected pressure is reduced, said fluid responsive means being responsive to said control signal pressure to control said fluid supplied to said control valves by said source.

2. A circuit as claimed in claim 1 wherein said pump comprises a fixed displacement pump and said fluid responsive means comprises a bypass valve for bypassing fluid to said sump.

3. A circuit as claimed in claim 1 wherein said pump is a variable displacement pump and said fluid responsive means includes a displacement control mechanism connected to said pump.

4. The system as claimed in claim 3 in which said fluid responsive means further includes a bypass valve for bypassing fluid to said sump and connected to said source of fluid supply and to said logic means whereby said displacement control mechanism and said bypass valve cooperate in controlling the fluid supplied to said plurality of control valves.

5. The hydraulic system as claimed in claim 1 in which said logic means includes at least three control ports in said plurality of control valves, a first fluid actuated valve means having a first control signal input port connected to one of said three control ports and a second control signal input port connected to a second of said three control ports and a control signal output port, and a second fluid actuated valve means having a first control signal input port connected to the third of said control ports, a second control signal input port connected to said first fluid actuated valve means, and a control signal output port connected to said fluid responsive means.

6. The hydraulic system as claimed in claim 5 in which one of said control valves has two control ports, said first and second input ports of said first fluid actuated valve means being connected to said two control ports in said one control valve to produce a first control signal pressure, a second fluid responsive means in the connection between said pump and said one control valve, and the control signal output port of said first fluid actuated valve means being connected to said second fluid responsive means whereby said second fluid responsive means controls the fluid supplied to said one control valve as a function of said control signal pressure.

7. The hydraulic system as claimed in claim 6 in which said pump is a fixed displacement pump and said first fluid responsive means is a bypass valve for bypassing fluid to said sump.

8. The hydraulic system as claimed in claim 6 in which said pump is a variable displacement pump and said first fluid responsive means is a displacement control mechanism connected to said variable pump.

9. The hydraulic system as claimed in claim 1 having at least two control valves and in which said logic means includes; two control ports in each control valve, a first three port fluid actuated valve having two of said ports connected to said two control ports of said first control valve to form a first logic system and a second three port fluid actuated valve having two of said ports connected with said two control ports of said second control valve to form another first logic system, and a third three port fluid actuated valve comprising a second logic system by connecting the third port of said first three port fluid actuated valve and the third port of said second three port fluid actuated valve to said fluid responsive means.

10. The hydraulic system as claimed in claim 9 in which one of said three port fluid actuated valves comprises a ball shuttle valve.

11. The hydraulic system as claimed in claim 1 in which said logic means includes a plurality of control ports in said valves, a plurality of three port fluid actuated valves interconnecting said plurality of control ports and effective to select a first control signal from the fluid pressures in at least two of said control ports and further select a second control signal from said first control signal and the fluid pressure in at least one other control port.

12. A circuit as claimed in claim 1 wherein said logic means is further effective to establish a flow path from said fluid responsive means to said sump and to negate said control signal pressure when none of said control valves is supplying pressure to a fluid motor, and said fluid responsive means is responsive to said negated control signal pressure when none of said control valves is supplying pressure to a fluid motor.

13. The hydraulic system as claimed in claim 12 in which said logic means includes at least three control ports in said plurality of control valves, a first fluid actuated valve means having a first control signal input port connected to one of said three control ports and a second control signal input port connected to a second of said three control ports and a control signal output port, and a second fluid actuated valve means having a first control signal input port connected to the third of said control ports, a second control signal input port connected to said first fluid actuated valve means, and a control signal output port connected to said fluid responsive means.

14. The hydraulic system as claimed in claim 13 in which one of said control valves has two control ports, said first and second input ports of said first fluid actuated valve means being connected to said two control ports in said one control valve to produce a first control signal pressure, a second fluid responsive means in the connection between said pump and said one control valve, and the control signal output port of said first fluid actuated valve means being connected to said second fluid responsive means whereby said second fluid responsive means controls the fluid supplied to said one control valve as a function of said control signal pressure.

15. The hydraulic system as claimed in claim 12 having at least two control valves and in which said logic means includes; two control ports in each control valve, a first three port fluid actuated valve having two of said ports connected to said two control ports of said first control valve to form a first logic system and a second three port fluid actuated valve having two of said ports connected with said two control ports of said second control valve to form another first logic system, and a third three port fluid actuated valve comprising a second logic system by connecting the third port of said first three port fluid actuated valve and the third port of said second three port fluid actuated valve to said fluid responsive means.

16. The hydraulic system as claimed in claim 12 in which said logic means includes a plurality of control ports in said valves, a plurality of three port fluid actuated valves interconnecting said plurality of control ports and effective to select a first control signal from the fluid pressures in at least two of said control ports and further select a second control signal from said first control signal and the fluid pressure in at least one other control port.

17. In a hydraulic system including a source of fluid supply comprising a pump and a sump, a fluid motor; a control valve having an inlet port, an exhaust port, first and second motor ports, first and second control ports, and a movable valving member adapted to direct pressure flow to said motor, to receive flow back from said motor, to connect one of said control ports to one of said motor ports when said one motor port is connected to said inlet port, and to connect the other of said control ports to said exhaust port; conduit means connecting said pump to said inlet port, said motor ports to said motor, said exhaust port to said sump, and said sump to said pump; a fluid responsive means connected to said conduit means interconnecting said source of fluid supply and said inlet port and responsive to a control signal pressure to control the fluid supplied to said control valve; fluid actuated valve means including first and second control signal input ports connected respectively to said first and said second control ports and also including a control signal output port connected to said fluid responsive means; and said fluid actuated valve means being effective to allow fluid from the control port that is connected to the motor port by said movable valving member to flow to said fluid responsive means for use as said control signal pressure and also effective to prevent said control signal pressure from being negated by flowing to the control port that is then connected to said exhaust port, whereby said fluid responsive means controls the fluid supplied to said control valve as a function of the fluid pressure in the control valve motor port that is connected to said inlet port.

18. The system as claimed in claim 17 in which said fluid actuated valve means comprises a three port shuttle valve.

19. The system as claimed in claim 18 in which said shuttle valve includes a ball shuttle.

20. The system as claimed in claim 17 in which said movable valving member includes a neutral position in which both said control ports are connected to said exhaust port by said movable valving member, and said fluid actuated valve means is adapted to allow said control signal pressure to be negated by flowing from said control signal output port to said exhaust port by way of one of said control ports, whereby said negation of said control signal provides a low standby system pressure when said member is in said neutral position by reducing said control signal pressure applied to said fluid responsive means.

21. The system as claimed in claim 17 in which said fluid actuated valve means provides a reverse flow path to the control port containing the higher fluid pressure, whereby the control signal pressure in said control signal output port will be reduced by reverse flow whenever said higher pressure is reduced.

22. The system as claimed in claim 17 in which said fluid responsive means comprises a bypass valve for bypassing fluid to said sump.

23. The system as claimed in claim 17 in which said pump is of the variable displacement type and said fluid responsive means comprises a displacement control mechanism operatively connected to said variable pump.

* * * * *

UNITED STATES PATENT OFFICE
CERTIFICATE OF CORRECTION

PATENT NO. : 3,693,506

DATED : September 26, 1972

INVENTOR(S) : Kenneth G. McMillen and Wendell E. Miller

It is certified that error appears in the above-identified patent and that said Letters Patent are hereby corrected as shown below:

Page 1 of the patent, under the heading:

"Related U. S. Application Data"

cancel "May 1, 1968, abandoned" and substitute

Signed and Sealed this

Thirtieth Day of January 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

PATENT NO. : 3,693,506

DATED : September 26, 1972

INVENTOR(S) : Kenneth G. McMillen and Wendell E. Miller

It is certified that error appears in the above-identified patent and that said Letters Patent are hereby corrected as shown below:

Under the provisions of C.F.R. 1.323 please make the following correction:

Page 1 of the patent, under the heading:

"Related U. S. Application Data"

cancel "May 1, 1968, abandoned" and substitute

-- September 6, 1968, abandoned --.

This certificate supersedes Certificate of Correction issued January 30, 1979.

Signed and Sealed this

Fifteenth Day of May 1979

[SEAL]

Attest:

RUTH C. MASON
Attesting Officer

DONALD W. BANNER
Commissioner of Patents and Trademarks